United States Patent [19]

Imaseki

[11] Patent Number: 4,961,042
[45] Date of Patent: Oct. 2, 1990

[54] DEVICE FOR CONTROLLING AC MOTOR

[75] Inventor: Takashi Imaseki, Yokosuka, Japan

[73] Assignee: Nissan Motor Company, Ltd., Japan

[21] Appl. No.: 313,349

[22] Filed: Feb. 21, 1989

Related U.S. Application Data

[63] Continuation of Ser. No. 938,067, Dec. 4, 1986, abandoned.

[30] Foreign Application Priority Data

Dec. 5, 1985 [JP] Japan ................. 60-272395

[51] Int. Cl.$^5$ .......................................... H02P 3/18
[52] U.S. Cl. ........................... 318/758; 318/741
[58] Field of Search ............... 318/758, 763, 764, 740, 318/741, 756, 759–762

[56] References Cited

U.S. PATENT DOCUMENTS

| | | | |
|---|---|---|---|
| 3,365,638 | 1/1968 | Risberg | 318/756 |
| 3,720,863 | 3/1973 | Ringland et al. | 318/809 |
| 3,731,169 | 5/1973 | Burgholte et al. | 318/801 |
| 3,848,165 | 11/1974 | Heiberger | 318/756 |
| 4,262,241 | 4/1981 | Azusawa | 318/764 |
| 4,316,132 | 2/1982 | Geppert | 318/811 |
| 4,544,868 | 10/1985 | Murty | 318/811 |
| 4,554,805 | 11/1985 | Hirooka et al. | 318/282 |
| 4,618,810 | 10/1986 | Hagerman et al. | 318/807 |

FOREIGN PATENT DOCUMENTS 57-49378  3/1982  Japan ................. 318/758

Primary Examiner—David Smith, Jr.
Attorney, Agent, or Firm—Lowe, Price, LeBlanc, Becker & Shur

[57] ABSTRACT

A device for controlling an AC motor for a fork lift truck comprises a detector to detect direction of rotation of an AC motor. The direction of rotation thus detected is compared with a desired direction of rotation of the AC motor, and the AC motor is controlled such that the AC motor operates in a power running mode when the actual direction of rotation of the AC motor is equal to the desired direction of rotation of the AC motor, but it operates in regenerative braking mode when said actual direction of rotation of the AC motor fails to be equal to the desired direction of rotation of the AC motor. The desired direction of rotation of the AC motor may be set manually by an operator or a driver of a vehicle drien by the AC motor.

10 Claims, 3 Drawing Sheets

DEVICE FOR CONTROLLING AC MOTOR

This application is a continuation of application Ser. No. 06/938,067, filed Dec. 4, 1986 now abandoned.

REFERENCE TO RELATED APPLICATION

Reference should be made to U.S. application Ser. No. 810,686 filed on Dec. 19, 1985.

BACKGROUND OF THE INVENTION

The present invention relates to a device for controlling an AC motor which is used for driving a vehicle.

The AC induction motors are attracting attention as a promising substitute of a DC motor of an electric motor driven wheeled vehicle although the DC motors have been widely used due mainly to the fact that they are easy to control. As compared to the DC motors, they are simple in construction, easy to handle, of maintenance free because no brushes that are subject to wear are used, compact, light in weight, and suited for mass production. Besides after one charging operation, the motor vehicle with an AC induction motor can travel longer than with a DC motor. It is also possible to cause the AC motor to produce a drive torque as large as that required by the motor vehicle if appropriately controlled.

According to a known device for controlling an AC induction motor, if it is desired to change the direction of rotation to the reverse during forward running with the AC motor rotating in forward direction, a driver should step on a brake pedal to cause the AC motor to start regenerating braking to give a braking torque that is variable in proportion to the amount of brake pedal depression, and after the vehicle has come to a halt, he shifts a manipulator to the reverse to switch the direction of rotation of the motor by switching two motor drive signals among three-phase alternating drive signals.

The above mentioned copending U.S. application Ser. No. 810,686 discloses a device for controlling an AC induction motor. According to this proposed device, if a forward-reverse changeover switch is manipulated and the reverse is selected while the vehicle is travelling forward, the AC motor is caused to start regenerative braking. When the motor vehicle has come to a halt due to this regenerative braking, the two phases of the three phase motor drive signals are interchanged and the AC motor is caused to start power running. Since the regenerative braking of the motor is initiated upon recognizing a shift in position of the changeover switch, the processing of recognizing the shift in position of the change-over switch is needed. This processing requires a step of comparing the stored data for the position of the change-over switch with previously stored data for the position of the change-over switch.

SUMMARY OF THE INVENTION

According to the present invention, the direction of rotation of an AC motor is detected and compared with a desired direction of rotation of the AC motor, and the AC motor is controlled such that the AC motor operates in a power running mode when the actual direction of rotation of the AC motor is equal to the desired direction of rotation of the AC motor, but it operates in regenerative braking mode when said actual direction of rotation of the AC motor fails to be equal to the desired direction of rotation of the AC motor. The desired direction of rotation of the AC motor may be set manually by an operator or a driver of a vehicle driven by the AC motor.

DETAILED DESCRIPTION OF THE INVENTION

Figure 1:
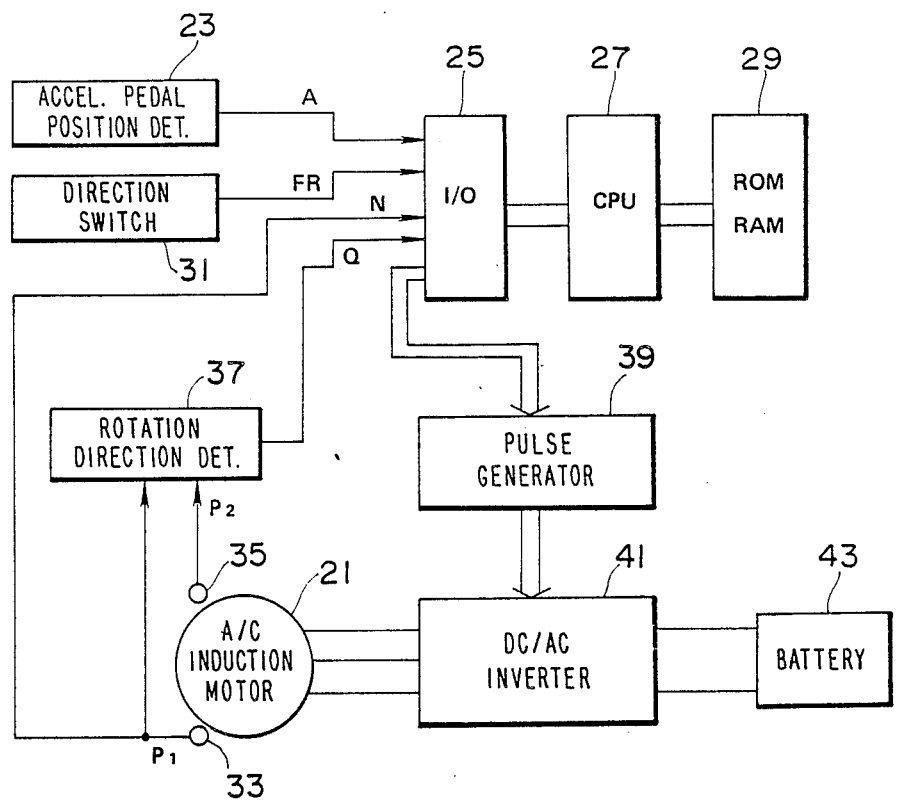
FIG. 1 shows in diagram a device for controlling an AC motor according to the present invention.

Referring to FIG. 1, reference numerals 21 designates an AC induction motor which is used as a prime mover for a fork lift truck equipped with an accelerator. There are provided an accelerator pedal depressed position detector 23 which detects depressed position of the accelerator and generates an accelerator depressed position indicative signal A which is deemed to be a representative signal of a driver's power demand. A changeover switch 31 is provided which may be manually operable by driver. The change-over switch 31 has a forward drive position and a reverse drive position and is designed such that a forward or reverse instruction signal FR is generated in response to the forward drive position or reverse drive position. Two pulse generators 33 and 35 are arranged around an appropriate portion of the motor 21 they are predetermined degrees out of position each other. They generate two trains of pulses P1 and P2 having different phases. These pulses P1 and P2 are supplied to a device 37 which judges direction of rotation of the AC motor 21 based on these signals and generates an actual direction indicative signal Q. Since the frequency of the pulse P1 is synchronized with rotation of the AC motor 21, the pulse P1 is used in this embodiment as a signal N indicative of rotation speed of the motor 21.

The above mentioned signals A, FR, Q, and N are supplied via an input/output interface circuit (herein abbreviated as I/O) 25 to a central processing unit (CPU) 27 where they are subject to processing.

In the known manner, the CPU 27 is operatively connected to a memory 29 including a ROM and a RAM to form a microcomputer. Outputs of the computer are issued via the I/O 25 to a pulse width modulator of a pulse generator 39. Outputs of the pulse generator 39 are supplied to an inverter 41. The inverter 41 is connected to a vehicle's battery 43 and converts DC voltage from the battery 43 to AC voltage.

Figure 2:
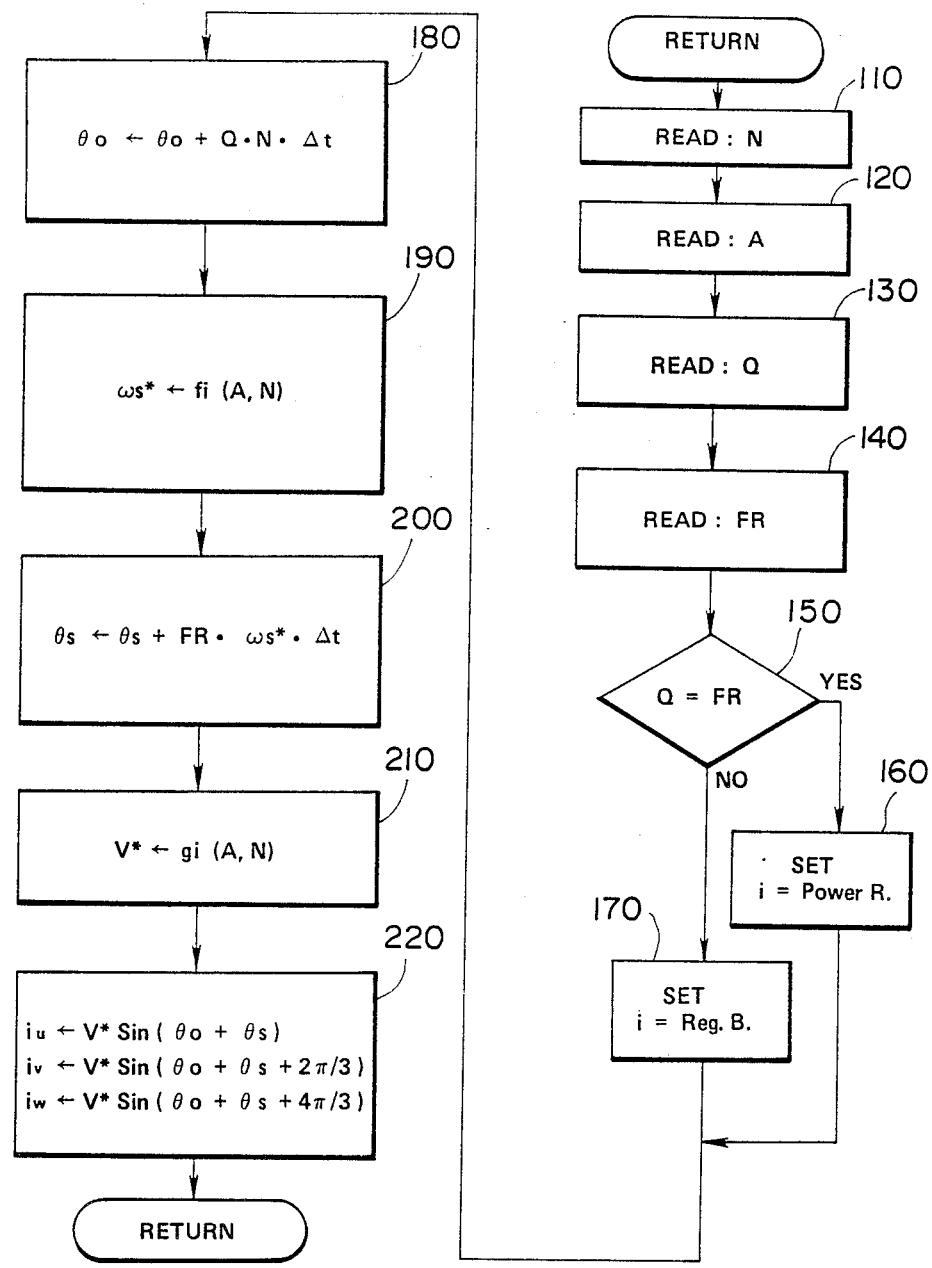
FIG. 2 is a flowchart of job steps executed by the device shown in FIG. 1.

FIG. 2 shows a flowchart of job steps to be excuted by the CPU 27. In step 110, the rotational speed N of the AC motor is read based on the pulse signal P1 of the first pulse generator 33 supplied to the I/O 25. In step 120, the depressed position A of the accelerator is read based on the output signal of the accelerator depressed position detector 23 supplied to the I/O 25. In step 130, the actual direction of rotation Q of the AC motor is read based on the output of the device 37. In step 140, the forward and reverse instruction FR is read based on the output of the change-over switch 31.

In step 150, the CPU 27 compares the stored actual diretion Q with the stored desired direction FR and makes a judgement whether Q is set equal to FR. If the actual rotational direction Q is set equal to the desired rotational direction FR, an instruction for power running is stored as a flag i in step 160, whereas if it falls to be equal to FR, an instruction for regenerative braking is set as the flag i in step 170. The change-over switch 31 is manually operable by a manual lever positioned near a driver's seat so that the desired rotational direction FR is manually selected by the driver.

After the content of the flag i has been set in step 160 or 170, an angle Oo stored is increased by Q·N. t in step 180. The variable Q is equal to +1 if the motor rotates in the forward direction, and to −1 if the motor rotates in the reverse direction. The value t indicates a time required to run one routine.

In step 190, the absoulte value of slip frequency $\omega s^*$ is determined by table look-up of a predetermined table using the depressed position of accelerator A and rotational speed of motor N which have been stored in steps 120 and 110, respectively. Different tables are provided for power running and regenerative braking and one of them is selected depending on the content of the flag i.

In step 200, using the stored slip frequency $\omega s^*$, slip angle Os is increased by $FR \cdot \omega s^* \cdot \Delta t$. The variable FS is equal to +1 of the forward rotation of desired, while it is eqal to −1 if the reverse rotation is desired.

In step 210, electric voltage $V^*$ to be applied to the motor is determined by table look-up of a predetermined table based on the accelerator depressed position A and rotational speed N which have been stored in steps 120 and 110. Different tables are prepared for power running and regenerative braking and appropriate one of them is selected depending on the content of the flag i.

In step 220, three output signals iu, iv, and iw which are to be applied to three phases of the motor 21 are determined using equations including stored data $V^*$, Oo, and Os, which equations are shown in FIG. 2. These output signals are supplied to the motor 21 via the I/O 25, PWM generator 39, and inverter 41.

With the control above described, the motor 21 is operated to enable smooth running of the vehicle.

Figure 3:
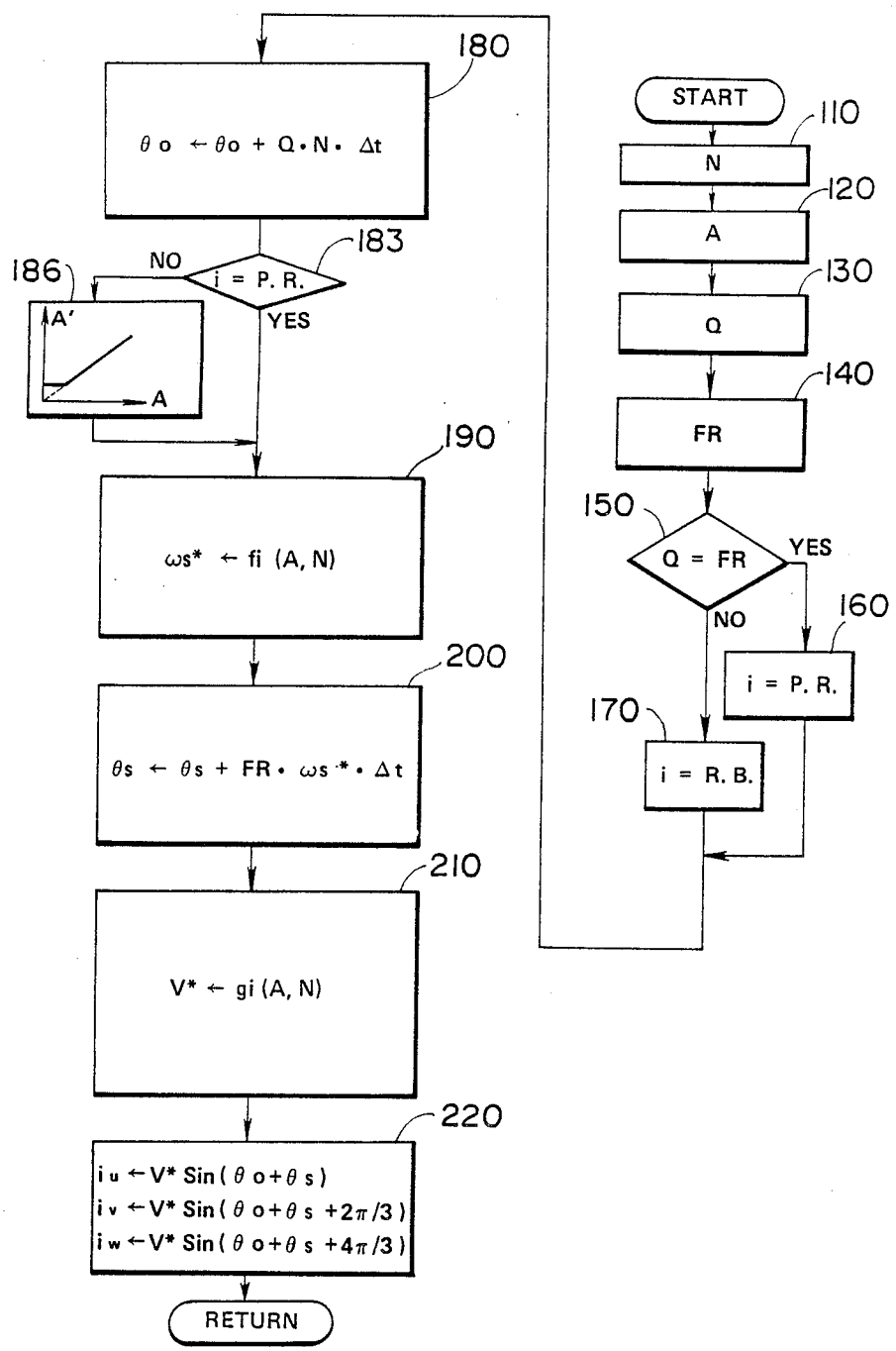
FIG. 3 is a flowchart used by a second embodiment.

Referring to FIG. 3, the second embodiment is described. This embodiment is substantially the same as the first embodiment except that two steps 183 and 186 have been inserted between steps 180 and 190. In the flowchart shown in FIG. 2, if the accelerator depressed position A, the motor 21 cannot operate in regenerative braking mode, so that the vehicle tends to move down during a delay between releasing of brake pedal and the subsequent depressing of accelerator. This embodiment has solved this shortcoming. In step 183, a decision is made whether the content of flag i indicates instruction for power running or instruction for regenerative braking. If the content of the flag indicates instruction for power running, the step 190 is executed. If the content of the flag indicates instruction for regenerative braking, the stored data A is converted and replaced with the result of this conversion. This conversion is carried out using a table as illustrated in FIG. 3 such that the stored data A is replaced with a predetermined positive value when the stored data A is smaller than a predetermined value. This table does not convert the stored data A when the stored data is not smaller than a predetermined value. With this conversion, the predetermined value is set as the data A even if the accelerator is released, thus ensuring the appropriate degree of regenerative braking even under this condition.

What is claimed is:

1. A device for controlling an AC motor operable in a power running mode and a regenerative braking mode, comprising:

position means for generating pulses in response to rotation of said AC motor;

detector means responsive to said pulses for detecting a direction of rotation of the AC motor and, responsive thereto, generating an actual direction indicator signal;

selector means for generating a desired direction indicator signal indicative of a desired direction of rotation of the AC motor; and control means for comparing said actual direction indicator signal with said desired direction indicator signal and, in response to said comparison, controlling the AC motor such that the AC motor operates (1) in said power running mode when said actual direction indicator signal is equal to said desired direction indicator signal and (2) in said regenerative braking mode when said actual direction indicator signal is not equal to said desired direction indicator signal.

2. A device as claimed in claim 1, including an accelerator, and means for detecting a position of said accelerator and, in response, generating an accelerator position indicator signal representative of a power demand.

3. A device as claimed in claim 2, wherein said control means includes calculating means for calculating a magnitude of electric voltage to be applied to the AC motor in response to said accelerator position indicator signal.

4. A device as claimed in claim 3, wherein said calculating means include means for setting said accelerator position indicator signal equal to a predetermined value when said accelerator position indicator signal is smaller than said predetermined value.

5. A device as claimed in claim 2, further including means for detecting rotational speed of the AC motor and generating a rotational speed indicator signal.

6. A device as claimed in claim 5, wherein said control means includes calculating means for calculating a magnitude of electric voltage to be applied to the AC motor in response to said accelerator position indicator signal and said rotational speed indicator signal.

7. A device as claimed in claim 1, wherein said selection means includes a manually operable change-over switch.

8. A method for controlling an AC motor operable in a power running mode and in a regenerative braking mode, comprising the steps of:

generating pulses in response to rotation of said AC motor;

detecting a direction of rotation of the AC motor in response to said pulses and, in response, generating an actual direction indicator signal;

generating a desired direction indicator signal indicative of a disired directioni of rotation of the AC motor; and comparing said actual direction indicator signal with said desired direction indicator signal, and in response, operating the AC motor in said power running mode when said actual direction indicator signal is equal to said desired direction indicator signal, and operating the AC motor in said regenerative braking mode when said actual direction indicator signal is not equal to said desired direction indicator signal.

9. A device for controlling an AC motor, said motor being operable in a power running mode and a regenerative braking mode, comprising:

accelerator input means for receiving a manual power requirement from an operator;

position detector means for detecting a position of said accelerator input means and generating an accelerator position indicative signal representative of said power demand;

direction detector means for detecting a direction of rotation of the AC motor and responsive thereto generating an actual direction indicator signal;

speed detector means for detecting a rotational speed of said AC motor and generating a rotational speed signal responsive thereto;

selector means for generating a desired direction indicator signal indicative of a desired direction of rotation of the AC motor; and control means including:

memory means for storing a table of predetermined regenerative braking control values for controlling said AC motor in said regenerative braking mode, said regenerative braking control values corresponding to respective rotational speed signal and accelerator position indicator signal values;

motor speed control means responsive to a motor control signal; and calculating means for calculating a magnitude of an electric voltage to be applied to said AC motor in response to said regenerative braking control values and, in response, supplying said motor control signal to said motor speed control means, said calculating means comparing said actual direction indicator signal with said desired direction indicator signal and in response to said comparison, supplying said motor control signal to said motor speed control means such that said AC motor operates in said power running mode when said actual direction indicator signal is equal to said desired direction indicator signal and operating said AC motor in said regenerative braking mode when said actual direction indicator signal fails to be equal to said desired direction indicator signal, said calculating means accessing said memory means responsive to said rotational speed signal and accelerator position indicator values to retrieve a corresponding one of said predetermined regenerative braking control values, and, in response to said retrieved braking control value, supply a corresponding motor control signal to said motor speed control means for controlling said AC motor in said regenerative braking mode in response to said regenerative braking control values in said memory means corresponding to respective rotational speed signal and accelerator position indicator signal values.

10. A method for controlling an AC motor, said AC motor being operable in a power running mode and in a regenerative braking mode, comprising the steps of:

position meand for generating pulses in response to rotation of said AC motor;

detector means respsonsive to said pulses for detecting a direction of rotation of said AC motor and, in response, generating an actual direction indicator signal;

generating a desired direction indicator signal indicative of a desired direction of rotation of said AC motor;

detecting a speed of rotation of said AC motor and operating a speed signal in response thereto;

detecting a position of an accelerator input device and, in response, generating a power requirement signal;

comparing said actual direction indicator signal with said desired direction indicator signal, and in response, operating said AC motor in said power running mode when said actual direction indicator signal is equal to said desired direction indicator signal, and operating said AC motor in said regenerative braking mode when said actual direction indicator signal fails to be equal to said desired direction indicator signal; and operating and providing a signal for controlling said AC motor operating in said regenerative braking mode in response to said speed signal and to said power requirement.

* * * * *